United States Patent
Sun et al.

(10) Patent No.: US 11,696,660 B2
(45) Date of Patent: Jul. 11, 2023

(54) SMART FOOD PROCESSING APPARATUS AND METHOD

(71) Applicant: KONINKLIJKE PHILIPS N.V., Eindhoven (NL)

(72) Inventors: Peichun Sun, Eindhoven (NL); Ming Li, Eindhoven (NL); Yun Chen, Eindhoven (NL); Jiani Tang, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/619,585

(22) PCT Filed: Dec. 4, 2020

(86) PCT No.: PCT/EP2020/084575
§ 371 (c)(1),
(2) Date: Dec. 16, 2021

(87) PCT Pub. No.: WO2021/115942
PCT Pub. Date: Jun. 17, 2021

(65) Prior Publication Data
US 2022/0296044 A1    Sep. 22, 2022

(30) Foreign Application Priority Data

Dec. 12, 2019  (WO) ................ PCT/CN2019/124932
Jan. 21, 2020  (EP) ..................................... 20152912

(51) Int. Cl.
*A47J 43/046* (2006.01)
*A47J 43/07* (2006.01)
(Continued)

(52) U.S. Cl.
CPC ......... *A47J 43/0722* (2013.01); *A47J 43/046* (2013.01); *A47J 43/0716* (2013.01);
(Continued)

(58) Field of Classification Search
CPC ... B02C 25/00; A47J 43/0716; A47J 43/0761; A47J 43/085
See application file for complete search history.

(56) References Cited

U.S. PATENT DOCUMENTS 9,161,662 B2 * 10/2015 Sladecek ............... A47J 43/046
10,589,286 B2 * 3/2020 Hopkins ................... B09B 3/00
(Continued)

FOREIGN PATENT DOCUMENTS

CN    108095579 A    6/2018
CN    110475493 A    11/2019
(Continued)

OTHER PUBLICATIONS

Rooney, C. M., et al., "Dynamics of particle chopping in blenders and food processors", Journal of Engineering Mathematics, vol. 112, Issue 1, pp. 119-135, Aug. 6, 2018.
(Continued)

*Primary Examiner* — Faye Francis
(74) *Attorney, Agent, or Firm* — Maschoff Brennan

(57) ABSTRACT

A food processing apparatus for preparing a fluid food product includes a food processing chamber including a blade arrangement driven by a motor; a particle sensor arranged to measure an actual particle size within said fluid food product in said food processing chamber and a controller arranged to control the motor. The controller is communicatively coupled to the particle sensor and may disengage the motor in response to a signal from the particle sensor indicative of the actual particle size reaching a threshold value of no less than 400 μm within said fluid food product.

15 Claims, 2 Drawing Sheets

(51) Int. Cl.
*A47J 43/08* (2006.01)
*B02C 25/00* (2006.01)

(52) U.S. Cl.
CPC ......... *A47J 43/0761* (2013.01); *A47J 43/085* (2013.01); *B02C 25/00* (2013.01)

(56) References Cited

U.S. PATENT DOCUMENTS

| | | | |
|---|---|---|---|
| 11,213,170 B2* | 1/2022 | Widanagamage Don | A47J 43/07 |
| 2005/0223906 A1* | 10/2005 | Xu | A47J 27/004 99/348 |
| 2006/0086843 A1 | 4/2006 | Lin et al. | |
| 2012/0286080 A1* | 11/2012 | Sladecek | A47J 27/004 241/101.3 |
| 2016/0038947 A1* | 2/2016 | Golino | A47J 43/085 241/199.12 |
| 2016/0309960 A1* | 10/2016 | Kolar | A47J 43/0766 |
| 2017/0050190 A1* | 2/2017 | Hopkins | B02C 23/12 |
| 2018/0059790 A1* | 3/2018 | Kolar | A47J 36/321 |
| 2018/0255975 A1* | 9/2018 | Kolar | B02C 18/083 |
| 2018/0272300 A1* | 9/2018 | Wallace | B01F 35/2205 |
| 2018/0338512 A1* | 11/2018 | Palmer | A47J 43/0716 |
| 2018/0368622 A1* | 12/2018 | Widanagamage Don | A47J 43/06 |
| 2019/0254481 A1* | 8/2019 | Frielinghaus | B01F 35/22161 |
| 2020/0275807 A1* | 9/2020 | Kolar | A47J 43/0761 |
| 2020/0281410 A1* | 9/2020 | Bannister | A47J 43/0716 |
| 2021/0153693 A1* | 5/2021 | Pichler | A47J 43/0766 |

FOREIGN PATENT DOCUMENTS

| | | |
|---|---|---|
| CN | 110520022 A | 11/2019 |
| EP | 3378365 A1 | 9/2018 |
| EP | 3586686 A1 | 1/2020 |
| EP | 3590393 A1 | 1/2020 |
| JP | 2019141342 A | 8/2019 |
| WO | 2016145430 A1 | 9/2016 |
| WO | 2018108642 A1 | 6/2018 |
| WO | 2019033843 A1 | 2/2019 |
| WO | 2019153676 A1 | 8/2019 |
| WO | 2021115942 A1 | 6/2021 |

OTHER PUBLICATIONS

Extended European Search Report issued in connection with corresponding EP Application No. 20152912.0 dated Jul. 15, 2020.
International Search Report and Written Opinion issued in connection with corresponding PCT Application No. PCT/EP2020/084575 dated Feb. 22, 2021.

* cited by examiner

SMART FOOD PROCESSING APPARATUS AND METHOD

CROSS-REFERENCE TO RELATED APPLICATIONS

The present application is a U.S. National Phase application under 35 U.S.C. § 371 of International Application No. PCT/EP2020/084575, filed on Dec. 4, 2020, which claims the benefit of European Patent Application No. 20152912.0, filed on Jan. 21, 2020, and International Application No. PCT/CN2019/124932, filed on Dec. 12, 2019. These applications are hereby incorporated by reference herein.

FIELD OF THE INVENTION

The present invention relates to a food processing apparatus for preparing a fluid food product comprising a food processing chamber including a blade arrangement driven by a motor and a controller arranged to control said motor.

The present invention further relates to a method of operating such a food processing apparatus.

BACKGROUND OF THE INVENTION

Food processors such as blenders, juicers and baby food makers are widely used to pulverize foods in order to produce fluid food products such as soups, smoothies, juices, baby food, purees and so on. This typically involves pulverizing fibrous ingredients such as fruit and/or vegetables together with liquids such as water, milk, a plant-based milk such as soy milk, almond milk, coconut milk or the like, yoghurt, and so on, in order to produce the desired fluid food product. As disclosed by C. M. Rooney et al. in the Journal of Engineering Mathematics, Volume 112, Issue 1, pages 119-135, mathematical models may be developed to explain the size distribution of particles in blenders to give insight into the behaviour of possible blender designs. Such models may be used to design a food processing apparatus such as a blender such that the produced fluid food product has the desired consistency in terms of particle size distribution.

An important nutrient of the fibrous ingredients of such fluid food products is dietary fiber, which is considered beneficial for gut health.
One of the important physico-chemical properties of such fibers is their hydration properties. Hydration properties of dietary fiber have been extensively studied in relation to the dietary fiber hypothesis. They partly influence the fate of dietary fibre in the gastrointestinal tract and account for some physiological effects such as faecal bulking. In the colon, fiber, especially insoluble fiber, can bind and absorb water like a sponge. This increases stool weight and shortens transit time through the large intestine, which is beneficial for colonic health.
Water-holding capacity (WHC) is commonly used as an indicator for the hydration properties of such dietary fibers. The water holding capacity is defined as the quantity of water that is bound to the dietary fiber without the application of an external force (other than gravity and atmospheric pressure).

SUMMARY OF THE INVENTION

The present invention seeks to provide a food processing apparatus for preparing a fluid food product comprising a food processing chamber including a blade arrangement driven by a motor and a controller arranged to control said motor in which the food processing apparatus may be operated to optimize the water holding capacity of dietary fiber in the fluid food product.

The present invention further seeks to provide a method of operating a food processing apparatus such that the water holding capacity of the dietary fibers in the fluid food product is optimized.

According to an aspect, there is provided a food processing apparatus for preparing a fluid food product comprising a food processing chamber including a blade arrangement driven by a motor; a particle sensor arranged to measure an actual particle size within said fluid food product in said food processing chamber; a controller arranged to control said motor, wherein the controller is communicatively coupled to the particle sensor and is adapted to disengage said motor in response to a signal from the particle sensor indicative of the actual particle size reaching a threshold value of no less than 400 μm within said fluid food product.

The present invention is based on the knowledge that the water holding capacity of dietary fiber is associated with particle size distribution of such fiber in the processed fluid food product. Without wishing to be bound by theory, it is believed that this is caused by destruction of the fiber matrix if dietary fibers are pulverized to fine particles, with this matrix structure being mainly responsible for the water holding capacity of dietary fiber. Therefore, by including a particle sensor in the design of the food processing apparatus and adapting the controller of the food processing apparatus such that the controller terminates the operation of the motor before the detected particle sizes drop below 400 μm, the water holding capacity of the (insoluble) dietary fibers is optimized by prevention of the destruction of their fiber matrix.

In the context of the present application, where reference is made to the detection of the particle size of particles, e.g. dietary fiber particles, within the fluid food product being processed, it should be understood that this may mean the detection of a minimum size of such particles or the detection of the average size of such particles. Moreover, the actual particle size in example embodiments may mean the minimum size (lower end point) or average (mean) size of a size distribution or size range of such particles as detected with the particle sensor.

In an embodiment, the threshold value lies in a range of 400-850 μm. This is based on the knowledge that the water holding capacity of some types of dietary fibers slowly decreases with increasing particle size, such that it is believed that within this range a particularly good water holding capacity by the fiber matrix is achieved, regardless of fiber type. Moreover, this ensures that the consumer of the finalized fluid food product is still presented with a fluid food product that is perceived as having a desirable taste, e.g. is relatively smooth, because the particle sizes in the fluid food product are minimized as much as possible without significantly compromising the water holding capacity of the dietary fibers contained therein, whilst avoiding (average) fiber particle sizes of over 850 μm, for which the resulting taste or consistency of the fluid food product may be considered unsatisfactory by its consumer. Preferably, the threshold value is in a range of 400-600 μm to optimize the taste or texture of the fluid food product whilst retaining the water holding capacity of the dietary fibers therein.

In a particular embodiment, the controller is further responsive to a threshold value selection signal and is adapted to select the threshold value based on said threshold value selection signal. For instance, the food processing apparatus may enable a user to generate a threshold value selection signal defining a relative processing time, e.g. short, medium or long, or a relative fluid food product texture, e.g. smooth, medium, coarse, or the like, with each of these selection options being associated with a particular threshold value preferably lying within the aforementioned threshold range such that the controller may disengage the motor and stop the processing of the fluid food product if the actual particle sizes therein have reached the user selected particular threshold value, thereby enabling a user to control the texture or taste of the fluid food product whilst maintaining its water holding capacity.

To this end, the food processing apparatus may further comprise a user interface communicatively coupled to the controller, wherein the user interface is adapted to generate the threshold value selection signal in response to a user making a selection with the user interface. Alternatively or additionally, the food processing apparatus may further comprise a communication interface communicatively coupled to the controller, wherein the communication interface is adapted to receive the threshold value selection signal from a remote device. For example, a user may be able to control the food processing apparatus through a software program such as an app running on the remote device, e.g. an electronic device such as a personal computer, smart phone, tablet computer, laptop computer or the like.

The particle sensor preferably is integrated in the food processing chamber to ensure accurate detection of the particle sizes within the fluid food product in the food processing chamber. In such a scenario, the particle sensor may be wirelessly connected to the controller, which has the advantage that in case of a food processing chamber that may be detached from a housing or base of the food processing apparatus, e.g. a jug or the like, no complex wired connectivity between the particle sensor and the controller facilitating such detachment of the food processing chamber is required.

The particle sensor may be one of an image sensor, a camera, an ultrasound sensor and a Brix sensor. Preferably, the particle sensor is an image sensor as this facilitates straightforward detection of particle sizes within the fluid food product in the food processing chamber. In an embodiment, the particle sensor comprises a detector and at least one light source arranged to project light onto the detector, said at least one light source being separated from the detector by an optical path inside the food processing chamber, said at least one light source being protected inside the food processing chamber by a mesh enveloping the at least one light source. With such a particle sensor, particle size within the fluid food product may be detected in a straightforward manner, e.g. by monitoring light scattering characteristics, whilst the mesh protects the at least one light source from accidental damage, e.g. when cleaning the food processing chamber.

The food processing apparatus may take any suitable shape. For example, the food processing apparatus may be a blender such as a jug blender, a cooking blender, stick blender, a juicer or a baby food maker.

According to another aspect, there is provided a method of operating a food processing apparatus for preparing a fluid food product and comprising a food processing chamber including a blade arrangement driven by a motor, a particle sensor arranged to measure an actual particle size within said fluid food product in said food processing chamber and a controller communicatively coupled to the particle sensor and arranged to control said motor, the method comprising, with said controller, engaging the motor to start processing the fluid food product in the food processing chamber; receiving a signal from said particle sensor indicative of the actual particle size within the fluid food product in the food processing chamber during said processing; and disengaging said motor if the signal from the particle sensor is indicative of the actual particle size within said fluid food product reaching a threshold value of no less than 400 µm.

This ensures that the dietary fibers within the fluid food product retain a good water holding capacity, thereby safeguarding the dietary quality of the fluid food product.

The threshold value may be in a range of 400-850 µm, preferably in a range of 400-600 µm, to ensure optimal water holding capacity by such dietary fibers whilst at the same time allowing the processing of a fluid food product having a desirable texture or smoothness by avoiding overly large particles, e.g. dietary fibers, in the fluid food product.

In an embodiment, the method further comprises receiving a threshold value selection signal with said controller; and selecting the threshold value based on said received threshold value selection signal. In this manner, the threshold value may be optimized as a function of how a user wants the fluid food product processed, e.g. to control its taste or texture.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
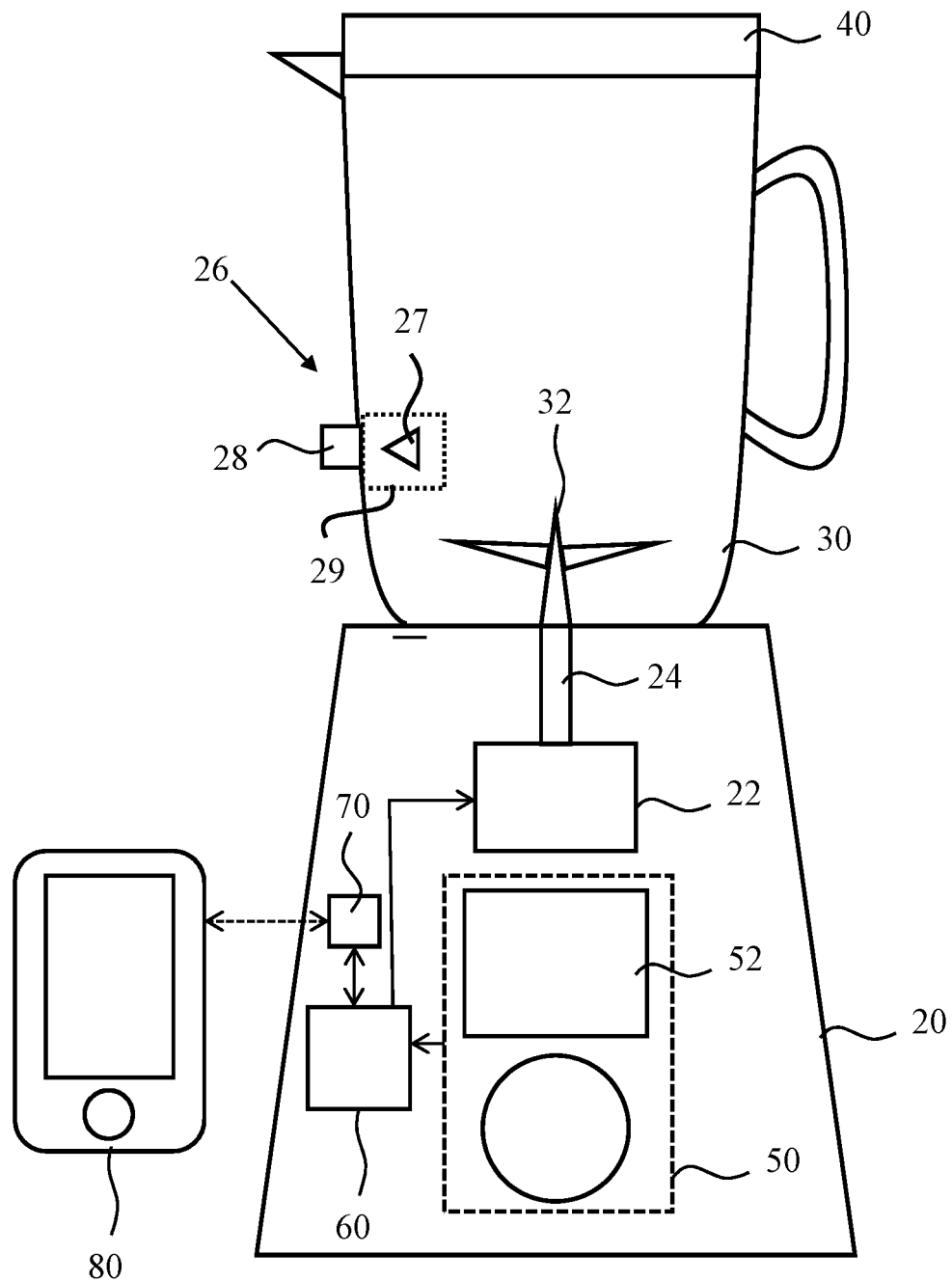
FIG. 1 schematically depicts a cross-sectional view of a food processing apparatus according to an embodiment.

It should be understood that the Figures are merely schematic and are not drawn to scale. It should also be understood that the same reference numerals are used throughout the Figures to indicate the same or similar parts.

FIG. 1 schematically depicts a food processing apparatus 10 according to an embodiment of the present invention. The food processing apparatus 10 may take any suitable shape, e.g. a kitchen appliance for processing food, in particular liquidized or fluid food products such as smoothies, juices or the like. In example embodiments, the food processing apparatus 10 is a blender, mixer, juicer or baby food maker although it should be understood that embodiments of the invention are not limited thereto. The food processing apparatus 10 comprises a food processing chamber 30, which typically comprises a blade arrangement 32 to grind, macerate or otherwise cut or blend food products. The blade arrangement 32 may be detachable from the food processing chamber 30, e.g. in order to facilitate cleaning of the blade arrangement 32. The food processing chamber 30 may take any suitable form, such as for example a glass or plastic jug or bowl that may be hermetically sealed by a lid 40. The food processing chamber 30 may be detachable from a base 20 of the food processing apparatus 10, e.g. for cleaning purposes.

The blade arrangement 32 is driven by a motor 22 under control of a controller 60, which may be housed in the base 20 of the food processing apparatus 10. The motor 22 may be coupled to the blade arrangement in any suitable manner, e.g. through a drive axle or shaft 24, gear box and so on. Such types of couplings are well-known per se and are therefore not explained in further detail for the sake of brevity only. The controller 60 may be any suitable control arrangement comprising one or more physical entities implementing such a control arrangement.

The food processing apparatus 10 further comprises a particle sensor 26 integrated in or coupled to the food processing chamber 30. The particle sensor 26 is communicatively coupled to the controller 60, e.g. wirelessly connected to the controller 60 via a wireless communication module 70 within the base 20 of the food processing apparatus 10. Any suitable wireless communication protocol such as Bluetooth or Wi-Fi may be used for such a wireless connection.

The particle sensor 26 is arranged to detect the (average) particle size of the particles suspended in the fluid food product during its processing within the food processing chamber 30 of the food processing apparatus 10. For example, the particle sensor 26 may be a sensor adapted to determine the light scattering characteristics of such particles in order to determine their (average) particle size or size distribution, as is well known per se. Such a particle sensor 26 may be an image sensor comprising at least one light source 27 spatially separated by an optical path from a detector 28 such as a photodiode array or an image sensor, wherein the at least one light source 27 is aimed at the detector 28. Particles passing through the optical path in between the at least one light source 27 and the detector 28 cause scattering of the light directed by the at least one light source 27 at the detector 28, which scattering characteristics may be translated by the controller 60 into the (average) particle size or size distribution of the particles within the fluid food product being processed within the food processing chamber 30. A mesh 29 may envelop the at least one light source 27 within the food processing chamber 30 such as to protect the at least one light source 27 from accidental damage. Such a mesh 29 may be made of any suitable material, e.g. a metal, metal alloy, polymer or combinations thereof.

Of course, it should be understood that the particle sensor 26 is not necessarily limited to an image sensor as other types of sensors equally may be used to determine the (average) particle size or size distribution of the particles suspended in the fluid food product being processed within the food processing chamber 30. For example, the particle sensor 26 may be a camera, in which case the controller 60 may be adapted to evaluate (high definition) images generated with the camera and determine the particle size or size distribution of the particles captured in such images using routine algorithms. Alternatively, the particle sensor 26 may be a Brix sensor, in which case the controller 60 may be adapted to derive such particle size (distribution) information from the refractive index of the fluid food product being processed within the food processing chamber 30. The sensor 26 instead may be an ultrasound sensor in which case the controller 60 may derive the (average) particle size or size distribution from the ultrasound echo characteristics acquired with such a sensor. Any suitable type of particle sensor 26 may be used for this purpose.

The controller 60 may be responsive to a user interface 50 through which the food processing apparatus 10 may be controlled, e.g. by a user selecting the mode of operation in which the food product within the food processing chamber 30 is to be processed. Such a user interface 50 may form part of the food processing apparatus 10, in which case the user interface 50 may be implemented in any suitable manner, e.g. as a touchscreen display, one or more switches, buttons, knobs or dials, and so on, or any combination of such user interface elements. The user interface 50 for example may be located on the base 20 of the food processing apparatus 10 or in any other suitable location thereon. The food processing apparatus 10 may further comprise a sensory output device 52 responsive to the processor 60 through which the processor 60 may cause the generation of a sensory output, e.g. an audible or visible output, for example to signal the completion of the processing of the fluid food product in the food processing chamber 30. Such a sensory output device 52 may take any suitable shape, e.g. a speaker, one or more lights such as LEDs, a display, and so on. The sensory output device 52 may form part of the user interface 50 although this is not necessarily the case.

Alternatively or additionally, a user interface for the food processing apparatus 10 may be implemented on a remote device 80, e.g. by way of a software program such as an app, through which the food processing apparatus 10 may be remotely controlled. For example, such a remote device 80 may be a computing device, a mobile communication device such as a smart phone, a tablet computer, a remote controller, and so on. In embodiments in which the food processing apparatus 10 may be controlled using such a remote device, the food processing apparatus 10 may communicate with the remote device 80 through its wireless communication module 70. Such a communication link may be a direct (P2P) link such as a Bluetooth link or the like, or may be an indirect link running through a communication management device such as a server, router or the like. As the technology involved with such communication links is well-known per se, this will not be explained in further detail for the sake of brevity only.

Figure 2:
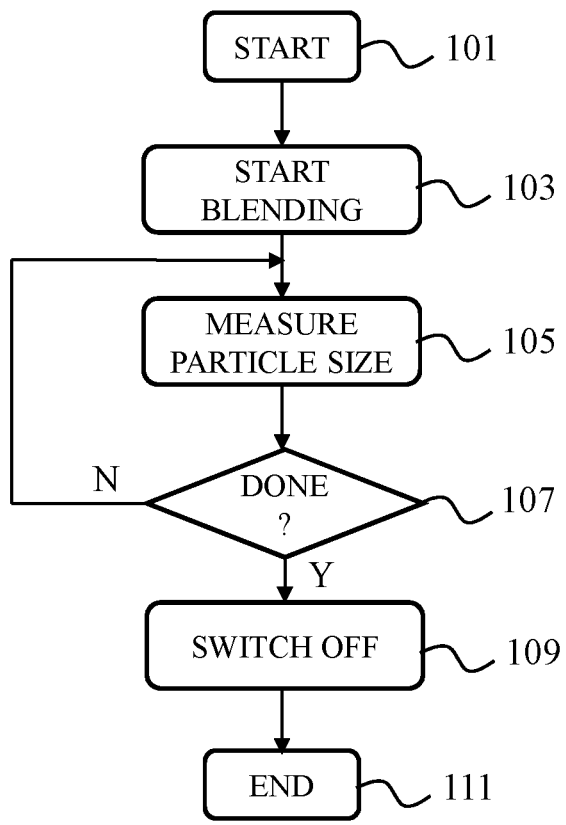
FIG. 2 is a flowchart of a method of operating a food processing apparatus according to an embodiment.

The operation of the food processing apparatus 10 in accordance with an embodiment of the present invention will now be explained in more detail with the aid of FIG. 2, which depicts a flowchart of a method 100 for controlling the processing of a fluid food product within the food processing chamber 30 of the food processing apparatus 10. The method 100 starts in operation 101, in which a user may load the ingredients (food types) of the fluid food product to be processed into the food processing chamber 30 of the food processing apparatus 10. The method 100 subsequently proceeds to operation 103, in which the motor 22 is engaged by the controller 60 in response to a start signal received from the user interface 50 or the remote device 80 indicating that the processing of the fluid food product within the food processing chamber 30 should commence. As will be understood from the foregoing, the engagement of the motor 22 causes the rotation of the blade arrangement 32 within the food processing chamber 30, thereby pulverising the solid materials, e.g. fibrous materials, loaded into the food processing chamber 30.

During the processing of the fluid food product, the controller 60 in operation 105 monitors the (average) particle size of the particles in the fluid food product being processed with the particle sensor 26. To this end, the controller 60 typically receives a signal from the particle sensor 26 indicative of the actual particle size within the fluid food product in the food processing chamber 30 during its processing, which signal may be processed by the controller 60 in order to obtain the actual particle size of the particles within the fluid food product being processed.

At this point, it is noted that such particles include (insoluble) dietary fibers, for which as previously explained a minimum particle size should be guaranteed in order to ensure that the water holding capacity of such dietary fibers is optimized. For example, for some hard or chewy food types or ingredients such as hard vegetables such as carrots or beetroot, the optimal particle size of the dietary fibers from such ingredients may be in the range of 250-850 μm to ensure optimal water-holding capacity by such dietary fibers, whereas for softer food types or ingredients, e.g. crunchier or juicier food types or ingredients such as salary and cucumber for example, the optimal particle size of the dietary fibers from such ingredients may be in the range of 400-1250 μm to ensure optimal water-holding capacity by such dietary fibers, whilst achieving a good taste or texture for the fluid food product, as will be explained in further detail below.

In an embodiment, the controller 60 is adapted to control the particle size within the food product being processed in the food processing chamber 30 independent of food or ingredient type. In this embodiment, the controller 60 in operation 107 compares the actual particle size as determined with the particle sensor 26 against a defined threshold for this particle size to ensure that the particle size within the fluid food product being processed in the food processing chamber 30 does not drop below 400 μm. As soon as the controller 60 detects that the actual particle size as detected with the particle sensor 26 has reached this threshold value, the controller 60 proceeds to operation 109 in which the motor 22 is disengaged and the rotation of the blade arrangement 32 is stopped to ensure that the actual particle size of the processed fluid food product is at least 400 μm. This ensures that regardless of food or ingredient type, the insoluble dietary fibers obtained from such food or ingredient types retain good water holding capacity due to their fiber matrix remaining intact.

The threshold value may be chosen in a range of 400-850 μm and preferably in a range of 400-600 μm to strike a good balance between the water holding capacity of the dietary fibers within the processed fluid food product and the taste and/or texture of the processed fluid food product. If the threshold value falls below 400 μm, the fiber matrix of the dietary fibers may be destroyed and the water holding capacity of such fibers may be decreased significantly. If the threshold value becomes larger than 850 μm, the texture or taste of the fluid food product may become unpleasant to some users. Hence, as will be understood from the foregoing description of the optimal ranges for different food types, this range is defined by the overlap of these two specific food type ranges and as such is guaranteed to give desirable results both in terms of water holding capacity and fluid food product taste in embodiments in which the fluid food product contains one or a mixture of these food or ingredient types. The actual value of the particle size as detected with the particle sensor 26 may be a single value or an average value within the aforementioned range of threshold values, or may be a particle size distribution contained within this range. Such a particle size distribution may cover all particles within the fluid food product or instead may apply to a defined portion of a larger particle size distribution, e.g. a central portion of a bell-shaped or Gaussian size distribution covering at least a majority of the particle sizes in such a distribution, e.g. 60%, 70%, 80% or 90% of all particle sizes in such a particle size distribution.

In a further embodiment, the user may control the setting of the threshold value within the aforementioned ranges, e.g. through the user interface 50 or the remote device 80 acting as a user interface, by the generation of a threshold value selection signal with the user interface 50 or the remote device 80 acting as a remote user interface. For example, such a user interface may offer the user a selection menu for selecting a processing mode of the fluid food product to control the particular taste and/or texture of the fluid food product to be processed (e.g. smooth, medium, coarse), with each of the selection options corresponding to a particular threshold value such that upon selection of a particular selection option by the user the controller 60 is programmed with the corresponding particular threshold value such that during processing of the fluid food product within the food processing chamber 30 the controller 60 may terminate the processing of the fluid food product by disengagement of the motor 22 once the particle size in the processed fluid food product has reached this particular threshold value. This ensures that the taste or texture of the fluid food product can be accurately controlled in accordance with user preference whilst at the same time ensuring that the water holding capacity of the insoluble dietary fibers within the processed fluid food product is not compromised.

Of course, the threshold value selection of the fluid food product may take any suitable shape or form. As an example alternative, the user may be able to select a short processing time, a medium processing time or a long processing time for the fluid food product, e.g. to facilitate a rapid food processing mode in case the user is in a hurry, with each of these processing times corresponding to different particular threshold values for the particle sizes within the fluid food product to be processed. As will be readily understood by the skilled person, a longer processing time typically corresponds to a lower particular threshold value, e.g. the particular threshold value for the short processing time may be 600 μm, the particular threshold value for the short processing time may be 500 μm and the particular threshold value for the long processing time may be 400 μm. Alternative particular threshold values of course may be chosen instead.

Upon the controller 60 disengaging the motor 22 in operation 109, the method 100 terminates in 111.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A food processing apparatus for preparing a fluid food product comprising:
   a food processing chamber including a blade arrangement driven by a motor;
   a particle sensor arranged to measure an actual particle size within said fluid food product in said food processing chamber; and
   a controller arranged to control said motor, wherein the controller is communicatively coupled to the particle sensor and is configured to disengage said motor in response to a signal from the particle sensor indicative of the actual particle size reaching a threshold value of no less than 400 μm within said fluid food product.

2. The food processing apparatus of claim 1, wherein the threshold value is in a range of 400-850 µm.

3. The food processing apparatus of claim 2, wherein the threshold value is in a range of 400-600 µm.

4. The food processing apparatus of claim 1, wherein the controller is further responsive to a threshold value selection signal and is configured to select the threshold value based on said threshold value selection signal.

5. The food processing apparatus of claim 4, further comprising a user interface communicatively coupled to the controller, wherein the user interface is configured to generate the threshold value selection signal in response to a user making a selection with the user interface.

6. The food processing apparatus of claim 5, further comprising a communication interface communicatively coupled to the controller, wherein the communication interface is configured to receive the threshold value selection signal from a remote device.

7. The food processing apparatus of claim 1, wherein the particle sensor is integrated in the food processing chamber.

8. The food processing apparatus of claim 1, wherein the particle sensor is wirelessly connected to the controller.

9. The food processing apparatus of claim 1, wherein the particle sensor is one of: an image sensor, a camera, an ultrasound sensor, and a Brix sensor.

10. The food processing apparatus of claim 9, wherein the particle sensor is an image sensor.

11. The food processing apparatus of claim 10, wherein the particle sensor comprises a detector and at least one light source arranged to project light onto the detector, said at least one light source being separated from the detector by an optical path inside the food processing chamber, said at least one light source being protected inside the food processing chamber by a mesh enveloping the at least one light source.

12. The food processing apparatus of claim 1, wherein the food processing apparatus is a blender, juicer, or baby food maker.

13. A method of operating a food processing apparatus for preparing a fluid food product, the method comprising:
  driving, by a motor, a blade arrangement in the food processing apparatus comprising a food processing chamber;
  measuring, by a particle sensor, an actual particle size within the fluid food product in the food processing chamber;
  engaging the motor, communicatively coupled with a controller, to start processing the fluid food product in the food processing chamber;
  receiving a signal from said particle sensor, communicatively coupled with the controller, indicative of the actual particle size within the fluid food product in the food processing chamber during said processing; and
  disengaging said motor, communicatively coupled with the controller, if the signal from the particle sensor is indicative of the actual particle size within said fluid food product reaching a threshold value of no less than 400 µm.

14. The method of claim 13, wherein said threshold value is in a range of 400-850 µm, preferably in a range of 400-600 µm.

15. The method of claim 13, further comprising:
  receiving a threshold value selection signal with said controller; and
  selecting the threshold value based on said received threshold value selection signal.

* * * * *